United States Patent
Kawka

(10) Patent No.: US 9,441,326 B2
(45) Date of Patent: *Sep. 13, 2016

(54) MULTILAYERED SHEET

(71) Applicant: E I DU PONT DE NEMOURS AND COMPANY, Wilmington, DE (US)

(72) Inventor: Dariusz Wlodzimierz Kawka, Midlothian, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/386,837

(22) PCT Filed: Apr. 17, 2013

(86) PCT No.: PCT/US2013/036870
§ 371 (c)(1),
(2) Date: Sep. 22, 2014

(87) PCT Pub. No.: WO2013/158700
PCT Pub. Date: Oct. 24, 2013

(65) Prior Publication Data
US 2015/0050475 A1 Feb. 19, 2015

Related U.S. Application Data

(60) Provisional application No. 61/625,912, filed on Apr. 18, 2012.

(51) Int. Cl.
*D21H 19/12* (2006.01)
*D21H 13/26* (2006.01)
*B32B 5/02* (2006.01)

(52) U.S. Cl.
CPC .............. *D21H 19/12* (2013.01); *B32B 5/022* (2013.01); *D21H 13/26* (2013.01);
(Continued)

(58) Field of Classification Search
CPC ...... C04B 28/00; D21H 13/26; D21H 17/68; D21H 17/63; D21H 19/10; D21H 19/12; D21H 21/34; D21H 27/00; B64C 1/40; Y10T 428/24942
See application file for complete search history.

(56) References Cited

U.S. PATENT DOCUMENTS 4,698,267 A   10/1987   Tokarsky
4,729,921 A    3/1988   Tokarsky
(Continued)

FOREIGN PATENT DOCUMENTS

EP      0774604 A1      5/1997
JP      2012-193777 A  10/2012
KR      10-2012-0004063 A   1/2012

OTHER PUBLICATIONS

Bonding and Coating Applications of PQ Soluble Silicates, 2008.*

*Primary Examiner* — Aaron Austin
*Assistant Examiner* — Michael Zhang

(57) ABSTRACT

This invention pertains to a layered sheet comprising a flame resistant wet-laid nonwoven paper having a first and second surface and an inorganic refractory layer adjacent to at least one surface of the paper wherein the refractory layer has a dry areal weight of from 15 to 50 gsm and the bond strength between the refractory layer and the surface of the paper is from 0.25 lb/in to 0.8 lb/in, wherein the carrier comprises from 40 to 70 weight percent of aramid fibers and from 30 to 60 weight percent of polymeric binder, is hydrophilic, has a smoothness on at least one surface of no greater than 150 Sheffield units, a thickness of from 0.025 to 0.175 mm and a density of from 0.60 to 1.1 g/cc.

14 Claims, 1 Drawing Sheet

(52) U.S. Cl.
CPC ... *B32B 2307/102* (2013.01); *B32B 2307/304* (2013.01); *B32B 2307/54* (2013.01); *B32B 2307/718* (2013.01); *Y10T 428/24942* (2015.01)

(56) References Cited

U.S. PATENT DOCUMENTS

| | | |
|---|---|---|
| 5,026,456 A | 6/1991 | Hesler et al. |
| 5,084,136 A | 1/1992 | Haines et al. |
| 5,223,094 A | 6/1993 | Kirayoglu et al. |
| 5,314,742 A | 5/1994 | Kirayoglu et al. |
| 5,418,050 A * | 5/1995 | Keefover-Ring ......... B32B 5/26 428/364 |
| 5,667,886 A | 9/1997 | Gough et al. |
| 6,322,022 B1 | 11/2001 | Fay et al. |
| 6,670,291 B1 * | 12/2003 | Tompkins ............... B32B 27/12 428/332 |
| 2003/0221740 A1 * | 12/2003 | Ohara .................... D03D 15/08 139/420 A |
| 2004/0214032 A1 * | 10/2004 | Hoyes .................. C04B 14/208 428/689 |
| 2005/0230072 A1 * | 10/2005 | Levit ..................... D21H 13/26 162/146 |
| 2011/0094826 A1 | 4/2011 | Richardson, III et al. |
| 2012/0321848 A1 * | 12/2012 | Richardson III ......... B64C 1/40 428/138 |
| 2012/0321849 A1 * | 12/2012 | Richardson, III ........ B64C 1/40 428/138 |
| 2012/0321883 A1 * | 12/2012 | Richardson, III ........ B64C 1/40 428/341 |
| 2013/0156984 A1 * | 6/2013 | Kawka .................. C08K 3/346 428/41.8 |
| 2014/0065357 A1 * | 3/2014 | Richardson, III ........ B64C 1/40 428/138 |
| 2015/0050475 A1 * | 2/2015 | Kawka .................. B32B 5/022 428/212 |
| 2015/0056429 A1 * | 2/2015 | Kawka .................. D21H 1/00 428/212 |

* cited by examiner

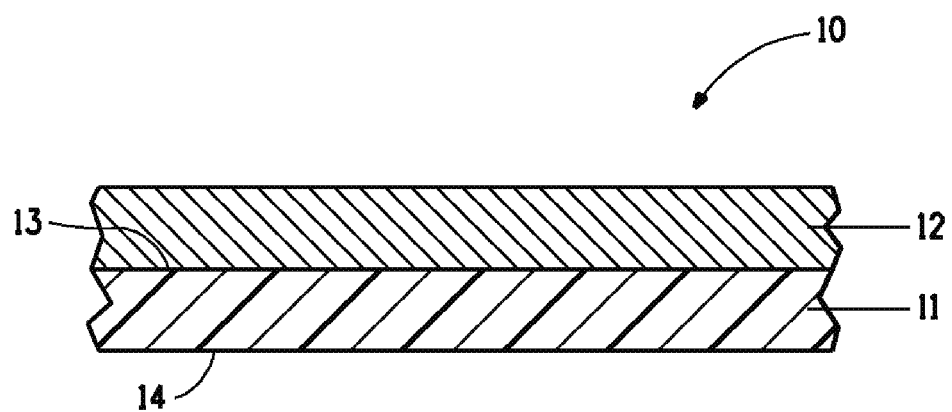

MULTILAYERED SHEET

CROSS-REFERENCE TO RELATED APPLICATIONS

This application claims the benefit under 35 U.S.C. §119 (e) of U.S. Provisional Application No. 61/625,912, filed Apr. 18, 2012 which is herein incorporated by reference.

BACKGROUND OF THE INVENTION

1. Field of Invention

This invention pertains to a multilayered sheet comprising a carrier layer and an inorganic refractory layer and a method of making the multilayered sheet. Preferably, the carrier layer is a paper.

2. Background of the Invention

U.S. Pat. No. 6,322,022 to Fay et al. discloses burn through resistant systems for transportation especially aircraft.

U.S. Pat. No. 6,670,291 to Tomkins and Vogel-Martin describes a laminate sheet material for flame barrier applications.

U.S. Pat. No. 5,667,886 to Gough et al describes a composite sheet having a substrate layer, a coating layer and a flexible adhesive layer. The substrate layer is preferably a polyester film. The coating layer contains a mineral, preferably vermiculite.

There remains an ongoing need for methods to provide a thin inorganic refractory layer in a form that may be safely handled and subsequently processed into a multi-layer composite for use as a flame barrier component in a thermal and acoustic blanket for aircraft structures.

SUMMARY OF INVENTION

This invention is directed to a layered sheet comprising a flame resistant high strength fiber wet-laid nonwoven paper having a first and second surface and an inorganic refractory layer adjacent to at least one surface of the paper wherein the refractory layer has a dry areal weight of from 15 to 50 gsm and a residual moisture content of no greater than 10 percent by weight, wherein the paper (i) comprises from 40 to 70 weight percent of aramid fibers and from 30 to 60 weight percent of polymeric binder, (ii) is hydrophilic (iii) has a wet tensile strength of at least 3 lb/in in a first direction and at least 2 lb/in in a second direction, the second direction being transverse to the first direction, (iv) has a dry tensile strength of at least 7 lb/in in a first direction and at least 3 lb/in in a second direction, the second direction being transverse to the first direction, (v) has an air permeability no greater than 2000 Gurley Air Resistance (sec/25 cc, 20 oz, cyl.), (vi) has a smoothness on at least one surface of no greater than 150 Sheffield units, (vii) has a surface release value from at least one surface of from 0.25 to 0.8 lb/in, (viii) has a thickness of from 0.025 to 0.175 mm, (ix) has a density of from 0.60 to 1.1 g/cc, and (x) has a basis weight of from 20 to 70 gsm.

This invention also pertains to a method of forming a layered sheet followed by subsequent treatment comprising the steps of (i) depositing an aqueous slurry of inorganic refractory platelets onto one surface of a carrier to form a layered sheet wherein the refractory platelets comprise from 7 to 13 weight percent of the slurry,
have a particle thickness of from 5 A to 5000 A,
have an average diameter of from 15 to 25 micrometers, wherein the carrier has (a) a wet tensile strength of at least 3 lb/in in a first direction and at least 2 lb/in in a second direction, the second direction being transverse to the first direction, (b) a dry tensile strength of at least 7 lb/in in the first direction and at least 3 lb/in in the second direction, (c) a smoothness on at least one surface of no greater than 150 Sheffield Units, (d) a thickness of from 0.025 to 0.175 mm, (e) a density of from 0.60 to 1.1 g/cc, (f) an air permeability no greater than 2000 Gurley Air Resistance (sec/25 cc, 20 oz. cyl.), (g) a surface release value from at least one surface of from 0.25 to 0.8 lb/in, (h) a basis weight of from 20 to 70 gsm, wherein the carrier comprises from 40 to 70 weight percent of aramid fibers and from 30 to 60 weight percent of polymeric binder, and (ii) drying the layered sheet at a temperature of from 80 to 110 degrees C. until the residual moisture content in the refractory layer is no greater than 10 percent by weight.

BRIEF DESCRIPTION OF DRAWINGS

FIG. 1 is a schematic cross section through a multilayered sheet of this invention.

DETAILED DESCRIPTION OF THE INVENTION

FIG. 1 shows a section through a multilayered sheet 10 comprising a carrier or substrate layer 11 and an inorganic refractory layer 12 deposited onto the carrier layer. A preferred carrier material is a high strength fiber wet-laid nonwoven carrier. A preferred nonwoven is a paper. As used herein, the terms "carrier" and "paper" are used interchangeably.

Carrier

A flame resistant high strength fiber paper has a first and second surface shown respectively at 13 and 14 in FIG. 1.

In one embodiment, the paper comprises from 40 to 70 weight percent of aramid fibers and from 30 to 60 weight percent of binder. In another embodiment, the paper comprises from 40 to 55 weight percent of aramid fibers and from 45 to 60 weight percent of binder. A preferred binder is meta-aramid.

The thickness of the paper used in this invention is dependent upon the end use or desired properties of the laminate but, to provide an overall high flexibility and the lowest possible weight, is typically from 1 to 7 mils (0.025 to 0.175 mm) or even from 1 to 4 mils (0.025 to 0.100 mm) thick. The paper thickness may even be from 1.5 to 3 mil (0.038 to 0.075 mm). A paper thickness below 1 mil would result in undesirable features such as a weaker and less dimensionally stable sheet, especially when saturated with water. A paper having a thickness greater than 7 mils would add undesirable weight and stiffness.

In some embodiments, the paper has a density of from 0.60 to 1.1 g/cc or from 0.65 to 0.95 g/cc or even from 0.70 to 0.85 g/cc. A paper density of below 0.60 g/cc, coupled with other paper characteristics, would result in undesirable features such as a weaker and excessively open structure. A paper density of greater than 0.60 g/cc requires additional densification, with suitable densification processes including, but not limited to, calendering, pressing in a platen press or a double-belt press. In some embodiments paper is exposed to a temperature of at least 280 degrees C. during the densification process or even to temperature of 330 to 360 degrees C. The denser paper allows for a thinner and mechanically stronger carrier, especially when paper densification is carried out at temperature of at least 280 degrees C.

Increased surface smoothness of the densified paper results in a lower release value from its surface allowing for an easy peeling off of the inorganic refractory film-like layer either as a stand-alone unsupported web or as a laminate after thermal or adhesive bonding to a suitable support material. Lower air permeability of the densified paper would to some extent affect the drying process of the coated paper, however it would still allow for relatively efficient drying.

In some embodiments, the basis weight of the paper is from 0.59 to 2.06 ounces per square yard (20 to 70 grams per square meter).

The paper has a surface smoothness on the surface that is in contact with the refractory layer of no greater than 150 Sheffield units. Smoothness is concerned with the surface contour of paper. It is the flatness of the surface under testing conditions which considers roughness, levelness, and compressibility. This test is an indirect measure of paper smoothness or roughness. The Sheffield test method is a measurement of air flow between the test specimen (backed by flat glass on the bottom side) and two pressurized, concentric annular lands that are impressed in to the sample from top. Such a procedure is described in TAPPI T-538 om-08. In some embodiments, the carrier has a surface smoothness on at least one surface of no greater than 80 Sheffield units.

The bond strength (release value) between the refractory layer and the surface of the paper is at least 0.25 lb/in, but no more than 0.8 lb/in. If the bond strength is less than 0.25 lb/in, the inorganic refractory layer can prematurely peel off the paper with a risk of breaks in the refractory layer. A bond strength of greater than 0.8 lb/in would make it more difficult to peel off the inorganic refractory film-like layer from the paper, especially as a stand-alone unsupported web. Bond strength is sometimes referred to as Release Value. In this instance, it is the Release Value between the surface of the paper and the intumescent coating applied to the paper.

The paper has a wet tensile strength of at least 3 lb/in in a first direction and at least 2 lb/in in a second direction, the second direction being transverse to the first direction. In another embodiment, the paper has a wet tensile strength of at least 15 lb/in in a first direction and at least 5 lb/in in a second direction, the second direction being transverse to the first direction. In a preferred embodiment the first direction is the long direction within the plane of the paper, that is, the direction in which the roll of paper has been made. This is also known as the machine direction. The second direction is sometimes known as the cross direction. By wet tensile strength we mean the tensile strength of the paper after saturation with water. If the wet tensile strength is less than 3 lb/in in a first direction, there is a high risk of frequent sheet breaks during the coating process due to the weight being deposited on the paper and the tension applied to the paper.

The paper has a dry tensile strength of at least 7 lb/in in a first direction and at least 3 lb/in in a second direction, the second direction being transverse to the first direction. By dry tensile strength we mean the tensile strength of a paper that has been conditioned at ambient temperature and humidity, typically 48-52% Relative Humidity and 22-24 degrees C. TAPPI T-402 sp-08 is an example specification defining ambient conditions for paper, board and pulp products.

A dry tensile strength of at least 7 lb/in in a first direction is required to ensure proper handling of the coated web through the subsequent process steps, in particular, to ensure tight roll formation during winding to prevent roll sagging and telescoping.

In some embodiments, the paper has a dry tensile strength of at least 20 lb/in in the first direction and at least 10 lb/in in the second direction.

The paper is hydrophilic. This feature aids the drying process. As the majority of the water from the refractory coating dispersion is absorbed by the paper, this allows more efficient drying and forming of the inorganic refractory layer as well as preventing drying defects such as blisters in the refractory layer.

The paper has an air permeability no greater than 2000 Gurley Air Resistance (sec/25 cc, 20 oz. cyl.). An air permeability of greater than 2000 Gurley Air Resistance (sec/25 cc, 20 oz. cyl.) would adversely affect the drying process of the coated paper. In some embodiments, the paper has an air permeability of no greater than 500 Gurley Air Resistance (sec/25 cc, 20 oz. cyl.).

The aramid fibers of the paper may be meta-aramid, para-aramid or a combination of the two.

The dimensional stability of aramid fibers ensures that the paper maintains an ability to hold flat (i.e. no moisture related wrinkles or creases) for at least 2 minutes when exposed to one-sided wetting.

The high temperature properties of the aramid fibers ensure thermal and mechanical stability of the carrier during processing steps when the carrier can be exposed to a temperature of 150 degrees C. for at least 10 minutes, that is to say, that the paper will not change dimensions when subjected to a temperature of 150 degrees C. for at least 10 minutes.

The aramid fibers of the paper can be in the form of floc, pulp, or a combination of thereof. As employed herein the term aramid means a polyamide wherein at least 85% of the amide (—CONH—) linkages are attached directly to two aromatic rings. Additives can be used with the aramid, In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid.

Floc is generally made by cutting continuous spun filaments into specific-length pieces. If the floc length is less than 2 millimeters, it is generally too short to provide a paper with adequate strength; if the floc length is more than 25 millimeters, it is very difficult to form uniform wet-laid webs. Floc having a diameter of less than 5 micrometers, and especially less than 3 micrometers, is difficult to produce with adequate cross sectional uniformity and reproducibility; if the floc diameter is more than 20 micrometers, it is very difficult to form uniform papers of light to medium basis weights.

The term "pulp", as used herein, means particles of fibrous material having a stalk and fibrils extending generally therefrom, wherein the stalk is generally columnar and 10 to 50 micrometers in diameter and the fibrils are fine, hair-like members generally attached to the stalk measuring only a fraction of a micrometer or a few micrometers in diameter and 10 to 100 micrometers long. Aramid fiber floc is of a similar length to carbon fiber floc. Both meta and pare aramid fibers are suitable and are available from E.I. DuPont de Nemours, Richmond, Va. under the tradenames Kevlar® and Nomex® and from Teijin Twaron, Conyers, Ga. under the tradename Twaron®.

A preferred pulp material is p-aramid. However a blend of p-aramid with other synthetic or natural fibers such as liquid crystal polyester, polyareneazole, meta-aramid, and cellulose can be utilized. One illustrative process for making aramid pulp is disclosed in U.S. Pat. No. 5,084,136 to Haines at al.

Different thermoset and thermoplastic resins can be used as a polymeric binder in the paper of this invention. These resins can be supplied in the form of fibrids, flakes, powder, and floc. The term "fibrids" as used herein, means a very finely-divided polymer product of small, filmy, essentially two-dimensional, particles known having a length and width of 100 to 1000 micrometers and a thickness of 0.1 to 1 micrometer. Preferable types of binder resins are aramids, polyimides, phenolics, and epoxies. However, other types of the resins can also be used.

Fibrids are typically made by streaming a polymer solution into a coagulating bath of liquid that is immiscible with the solvent of the solution. The stream of polymer solution is subjected to strenuous shearing forces and turbulence as the polymer is coagulated. The fibrid material of this invention can be selected from meta or para-aramid or blends thereof. More preferably, the fibrid is a meta-aramid.

The paper can include small amounts of inorganic particles including mica, vermiculite, and the like; the addition of these performance enhancing additives being to impart properties such as improved fire resistance, thermal conductivity, dimensional stability, and the like to the paper and the final laminate.

In one preferred embodiment, the fiber and the polymer binder in the form of fibrids can be slurried together to form a mix that is converted to paper on a wire screen or belt. Reference is made to U.S. Pat. Nos. 4,698,267 and 4,729,921 to Tokarsky; U.S. Pat. No. 5,026,456 to Hesler at al.; U.S. Pat. Nos. 5,223,094 and 5,314,742 to Kirayoglu at al for illustrative processes for forming papers from aramid fibers and aramid fibrids.

Once the paper is formed, it may be calendered to the desired void content/apparent density.

Inorganic Refractory Layer

The inorganic refractory layer is adjacent to at least one surface of the carrier. The refractory layer has a dry areal weight of from 15 to 50 gsm and a residual moisture content of no greater than 10 percent by weight. In some embodiments, the refractory layer has a dry areal weight of from 20 to 35 gsm and a residual moisture content of no greater than 3 percent by weight. The layer is shown as 12 in FIG. 1.

The refractory layer comprises platelets. Preferably at least 85% of the layer comprises platelets, more preferably at least 90% and most preferably at least 95%. In some embodiments, platelets comprise 100% of the layer. The refractory layer may comprise some residual dispersant arising from incomplete drying of the platelet dispersion during manufacture.

The refractory layer has a thickness of from 7.0 to 76 micrometers and more preferably from 7.0 to 50 micrometers. Preferably, the layer has a UL 94 flame classification of V-0. The function of the refractory layer, in which adjacent platelets overlap, is to provide a flame and hot gas impermeable barrier. The inorganic platelets may be clay, such as montmorillonite, vermiculite, mica, talc and combinations thereof. Preferably, the inorganic oxide platelets are stable (i.e., do not burn, melt or decompose) at about 600 degrees C., more preferably at about 800 degrees C. and most preferably at about 1000 degrees C. Vermiculite is a preferred platelet material. Vermiculite is a hydrated magnesium aluminosilicate micaceous mineral found in nature as a multilayer crystal. Vermiculite typically comprises by (dry) weight, on a theoretical oxide basis, about 38-46% $SiO_2$, about 16-24% MgO, about 11-16% $Al_2O_3$, about 8-13% $Fe_2O_3$ and the remainder generally oxides of K, Ca, Ti, Mn, Cr, Na, and Ba. "Exfoliated" vermiculite refers to vermiculite that has been treated, chemically or with heat, to expand and separate the layers of the crystal, yielding high aspect ratio vermiculite platelets. Suitable vermiculite materials are available from W. R. Grace of Cambridge, Mass., under the trade designations MicroLite 963 and MicroLite HTS-XE.

The thickness of an individual platelet typically ranges from about 5 Angstroms to about 5,000 Angstroms more preferably from about 10 Angstroms to about 4,200 Angstroms. The mean value of the maximum width of a platelet typically ranges from about 10,000 Angstroms to about 30,000 Angstroms. The aspect ratio of an individual platelet typically ranges from 100 to 20,000.

Preferably, the platelets have an average diameter of from 15 to 25 micrometers. In some other embodiments, the platelets have an average diameter of from 18 to 23 micrometers.

In a preferred embodiment, the refractory layer further comprises cations arising from contact, at a temperature of from 10 to 50 degrees C., with an aqueous cationic rich solution at a cation concentration of from 0.25 to 2N. The contact with the cationic solution occurs prior to assembling the refractory layer into a composite laminate. This cationic treatment provides enhanced stability to the refractory layer on exposure to fluids.

In some embodiments of this invention, the inorganic platelet layer is reinforced by a lightweight open weave fabric scrim either laid onto a single platelet layer or placed between two layers of platelets so as to provide additional mechanical strength to the layer. The scrim can be made from natural, organic or inorganic fibers with glass, cotton, nylon or polyester being typical examples. A glass fiber scrim is particularly preferred. The scrim may be a woven or knit structure and has a typical areal weight not exceeding 40 grams per square meter.

In some embodiments, the refractory layer is perforated to enhance bonding to an adhesive layer during subsequent processing. The extent of perforation is determined by experimentation. Preferably, in order to prevent compromising flame barrier properties, an individual perforation should not exceed 2 millimeters in maximum dimension. In a preferable embodiment, individual perforations should be spaced at least 10 millimeters apart. The shape of the perforations is not critical, Suitable perforations include circles, squares, rectangles, ovals and chevrons.

Method of Forming the Multilayered Sheet

A method of forming a layered sheet followed by subsequent treatment comprises the steps of (i) depositing an aqueous slurry of inorganic refractory platelets onto one surface of a carrier to form a layered sheet wherein the refractory platelets comprise from 7 to 13 weight percent of the slurry, have a particle thickness of from 5 A to 5000 A, have an average diameter of from 15 to 25 micrometers, wherein the carrier has
- (a) a wet tensile strength of at least 3 lb/in in a first direction and at least 2 lb/in in a second direction, the second direction being transverse to the first direction,
- (b) a dry tensile strength of at least 7 lb/in in the first direction and at least 3 lb/in in the second direction,
- c) a smoothness on at least one surface of no greater than 150 Sheffield Units,
- (d) a thickness of from 0.025 to 0.175 mm,
- (e) a density of from 0.60 to 1.1 g/cc,
- (f) an air permeability no greater than 2000 Gurley Air Resistance (sec/25 cc, 20 oz. cyl.),
- (g) a surface release value from at least one surface of from 0.25 to 0.8 lb/in,
- (h) a basis weight of from 20 to 70 gsm, and wherein the carrier comprises from 40 to 70 weight percent of aramid fibers and from 30 to 60 weight percent of polymeric binder, and (ii) drying the layered sheet at a temperature of from 80 to 110 degrees C. until the residual moisture content in the refractory layer is no greater than 10 percent by weight.

When the refractory platelets comprise from 11.5 to 13 weight percent of the slurry, it is preferable that the slurry is de-aerated (de-gassed) prior to deposition on the paper. This will reduce defects due to trapped air.

Preferably, when the platelet content of the slurry is from 7.0 to 8.5 percent and the desired coat weight is 27 gsm or higher, then the coating is applied in multiple steps. For example, a 30 gsm total coat weight could be achieved by two applications of slurry each providing 15 gsm of refractory material or by three applications at 10 gsm.

In some embodiments, the layered sheet is dried at a temperature of from 80 to 110 degrees C. until the residual moisture content in the refractory layer is no greater than 3 percent by weight. In some other embodiments, the method comprises an optional step of increasing the drying temperature in step (ii) to from 150 to 180 degrees C. after the residual moisture content in the refractory layer is less than 10 percent.

In some embodiments, the refractory platelets comprise from 10 to 11 weight percent of the slurry.

Preferably the layered sheet, when wet, has a shrinkage no greater than 2 percent.

Prior to coating the paper with refractory material, the paper may optionally be treated to promote better wetting. An example of such a treatment is plasma or corona treatment.

Use of the Refractory Layer

The layered sheet may be used as a component in a flame barrier layer for a thermal insulation and acoustic blanket. An example of such a blanket is described in United States patent application publication 2011/0094826.

Test Methods

The wet tensile strength of the paper was measured according to TAPPI T456 om-10 Tensile Breaking Strength of Water-saturated Paper and Paperboard ("Wet Tensile Strength").

The dry tensile strength of the paper was measured according to TAPPI T494 om-06 Tensile Properties of Paper and Paperboard (Using Constant Rate of Elongation Apparatus).

The surface smoothness of the paper was measured according to TAPPI T538 om-08 Roughness of Paper and Paperboard (Sheffield Method), The thickness of the paper was measured by TAPPI T411 om-10 Thickness (Caliper) of Paper, Paperboard, and Combined Board.

The density of the paper is a calculated value based on the measured values of carrier thickness and basis weight.

The air permeability of the paper was measured according to TAPPI T460 om-11 Air Resistance of Paper (Gurley Method, sec/100 cc, 20 oz. cyl.).

The dimensional stability of the paper was rated based on its ability to hold flat (i.e. no moisture related wrinkles or creases) for at least 2 minutes when exposed to one-sided wetting.

The dry areal weight of the refractory layer was measured according to ISO 536 (1995) Determination of Grammage and TAPPI T 410 Grammage of Paper and Paperboard (Weight per Unit Area).

The moisture content of the refractory layer was measured according to ISO 287 (1985) Determination of Moisture Content—Oven Drying Method.

Selected composite sheets were subjected to a flame test that replicated the temperature and air mass flux test conditions of test method FAA FAR 25.856(b), App. F, Part VII. The somewhat lower heat flux was compensated with a higher air mass flux to replicate a required thermo-mechanical stress level to be exerted on the flame barrier composites during the burn-through test.

EXAMPLES

In the following examples, all parts and percentages are by weight and all degrees in centigrade unless otherwise indicated. Examples prepared according to the current invention are indicated by numerical values. Control or Comparative Examples are indicated by letter The vermiculite used was a high solids version of an aqueous dispersion of Microlite® 963 having an as supplied solids content of 7.5 percent. The dispersion was obtained from W.R. Grace and Co, Cambridge, Mass.

Example 1

Vermiculite dispersion concentrated to a solids content of 11.6% weight percent was coated on a highly densified 2 mil thick meta-aramid paper using a doctor blade to form a refractory layer on the paper. The paper was 5-mil grade Nomex® from DuPont calendered at 360 degrees C. to produce a finished paper having basis weight of 1.19 oz/sq. yd., an average thickness of 2.19 mil, a density of 0.75 g/cc, a Gurley Air Resistance of 450 sec/25 cc, 20 oz. cyl., a smoothness of less than 100 Sheffield units, a dry tensile strength of 24 lb/in, in the machine direction and 12 lb./in. in the cross direction. The wet tensile strength was 21.09 lb/in, in the machine direction and 6.20 lb./in. in the cross direction.

The paper comprised from 45 to 50 weight percent of meta-aramid fiber and from 50 to 55 weight percent of polymeric binder in the form of fibrids.

The coated paper was dried for 15 minutes in an air flotation conventional oven at a temperature of 85 degrees C. until the inorganic refractory layer had moisture content below 5%. The refractory layer had a dry coat weight of 37 gsm.

From inspecting a sample of the two layer composite, it was observed that the dried refractory layer easily peeled away from the aramid carrier, especially after flexing. With good peel characteristics of the paper it was possible to peel an unsupported inorganic refractory film-like material without any breaks. With an extra care the unsupported inorganic refractory film-like layer was further thermally laminated between two thermoplastic films into a layered composite flame barrier laminate.

Example 2

This was as Example 1 except that adhesive lamination was used to make a final laminate structure. The findings were the same as for Example 1.

Example 3

This was as Example 1 except that a low temperature densification method was used. The paper was 5-mil grade Nomex® from DuPont calendered at 200 degrees C. to produce a finished paper having a basis weight of 1.18 oz/sq. yd., an average thickness of 1.66 mil, a density of 0.96 g/cc, a Gurley Air Resistance of 1865 sec/25 cc, 20 oz, cyl., a smoothness of less than 100 Sheffield units, a dry tensile strength of 15.22 lb./in. in the machine direction and 7.89 lb./in. in the cross direction. The wet tensile strength was 5.8 lb/in, in the machine direction and 2.22 lb./in. in the cross direction.

The coated paper was dried for a total of 30 minutes in two steps each of 15 minutes in an air flotation conventional oven at a temperature of 85 degrees C. until the inorganic refractory layer had moisture content below 5%. The refractory layer had a dry coat weight of 37 gsm.

From inspecting a sample of the two layer composite, it was observed that the dried refractory layer was not as uniform as for Example 1. Remaining findings were the same as for Example 1.

Comparative Example A

Vermiculite dispersion concentrated to a solids content of 11.6% weight percent was coated on 3 mil thick para-aramid paper using a doctor blade to form a refractory layer on the paper. The paper was a 3-mil grade paper from DuPont calendered at 360 degrees C. to produce a finished paper having a basis weight of 1.78 oz/sq. yd., an average thickness of 2.88 mil, a density of 0.83 g/cc, a Gurley Air Resistance of 6 sec/100 cc, 20 oz. cyl., a dry tensile strength of 19 lb/in, in the machine direction and 16 lb./in. in the cross direction. The wet tensile strength was 7.5 lb/in, in the machine direction and 6.3 lb./in. in the cross direction. The paper comprised 10 to 30 weight percent of para-aramid fiber and 70 to 90 weight percent of polymeric binder in the form of fibrids.

The coated paper was dried for 15 minutes in an air flotation conventional oven at a temperature of 85 degrees C. until the inorganic refractory layer had moisture content below 5%. The refractory layer had a dry coat weight of 37 gsm.

The inorganic refractory layer on the aramid paper formed an effective lightweight and flexible 2-layer composite. There were no practical ways to remove any substantial sections of the refractory layer from the paper base without the aid of a reinforcing substrate bonded to the exposed side of the refractory film layer. The inorganic refractory material remained attached to the surface of the aramid paper even after substantial flexing.

Comparative Example B

This was as Comparative Example A except that a different densification method was used. The paper was a commercial grade paper from DuPont calendered at 200 degrees C. to produce a finished paper having a basis weight of 1.8 oz/sq. yd., an average thickness of 2.63 mil, a density of 0.92 g/cc, a Gurley Air Resistance of 20 sec/100 cc, 20 oz. cyl., a dry tensile strength of 17.69 lb./in. in the machine direction and 13.67 lb./in. in the cross direction. The wet tensile strength was 5.49 lb/in, in the machine direction and 5.37 lb./in. in the cross direction.

The coated paper was dried for 15 minutes in an air flotation conventional oven at a temperature of 85 degrees C. until the inorganic refractory layer had moisture content below 5%. The refractory layer had a dry coat weight of 37 gsm. The findings were the same as for Comparative Example A Comparative Example C Vermiculite dispersion concentrated to a solids content of 10.6% weight percent was coated on 5 mil thick meta-aramid paper using a slot die coating system to form a refractory layer on the paper. The paper was T413 grade Nomex® from DuPont. The paper comprised from 45 to 50 weight percent of meta-aramid fiber and from 50 to 55 weight percent of polymeric binder in the form of fibrids.

The paper had a basis weight of 1.23 oz/sq. yd., an average thickness of 4.9 mil, a density of 0.34 g/cc, a Gurley Air Resistance of 316 sec/100 cc, 20 oz. cyl., a smoothness of 325 Sheffield units, a dry tensile strength of 10.7 lb./in. in the machine direction and 5.5 lb./in. in the cross direction. The wet tensile strength was 5.1 lb/in, in the machine direction and 2.95 lb./in. in the cross direction. The coated paper was dried for 15 minutes in an air flotation oven at a temperature not exceeding 110 degrees C. until the inorganic refractory layer had moisture content below 5%. Differential drying temperatures were applied to the top (vermiculite side) and the bottom (paper side). The drying profile on the top side was 5 minutes at 49 degrees, 5 minutes at 60 degrees and 5 minutes at 71 degrees. The drying on the bottom side was maintained for 15 minutes at 99 degrees. The refractory layer had a dry coat weight of 37 gsm. The two layer composite of paper and refractory layer was wound up on a roll.

The findings were the same as for Comparative Example A

Comparative Example D

Vermiculite dispersion concentrated to a solids content of 10.6 weight percent was coated on 2-mil thick metallized polyester film using a slot die coating system to form a refractory layer on the film. The film was metalized on one side. The coating was applied to the metalized side of the film. The film was obtained under the tradename Mylar from E.I. DuPont de Nemours and Co., Wilmington, Del. The coated film was dried in an oven at a temperature not exceeding 110 degrees C. until the inorganic refractory layer had moisture content below 5%. The total drying time exceeded 75 minutes comprising a staged drying of 15 minutes at 60 degrees, 15 minutes at 71 degrees, 15 minutes at 82 degrees, 15 minutes at 93 degrees, and over 15 minutes at 99 degrees. The refractory layer had a dry coat weight of 35 gsm. The paper and refractory layers were wound up on as separate rolls.

From inspecting a sample of the two layer composite, it was observed that the dried refractory layer spontaneously peeled away from the metallized side of the film.

Comparative Example E

Vermiculite dispersion concentrated to a solids content of 13 weight percent was coated on a 6 micron thick polyetheretherketone (PEKK) film using a slot die coating system to form a refractory layer on the film. The film was grade DS-E obtained from Cytec Industries, Woodland Park, N.J. The coated film was dried in an oven at a temperature not exceeding 110 degrees C. until the inorganic refractory layer had moisture content below 5%. The drying time exceeded 45 minutes comprising a staged drying of 9 minutes at 71 degrees, 6 minutes at 82 degrees, 6 minutes at 93 degrees, and 25 minutes at 96 degrees. The refractory layer had a dry coat weight of 33 gsm. The two layer composite of film and refractory layer was wound up on a roll.

The coating process proved to be very difficult due to tendency for the film to wrinkle and crease. Further, the film had to be surface treated by a process such as corona treatment to promote wetting and give a uniform coating, Although relatively continuous refractory layer coating was obtained the refractory layer was highly non-uniform and affected by streaks and light spots related to excessive air bubbles trapped in the high viscosity solution.

Comparative Example F

Vermiculite dispersion concentrated to a solids content of 7.5 weight percent was coated on 0.5 mil thick polyimide film using a knife over roll coating system to form a refractory layer on the film. The film was obtained under the tradename Kapton from E.I. DuPont de Nemours and Co., Wilmington, Del. The coated film was dried in an oven at a temperature not exceeding 110 degrees C. until the inorganic refractory layer had moisture content below 5%. The drying time exceeded 75 minutes comprising a staged drying of 20 minutes at 71 degrees, 20 minutes at 82 degrees, 20 minutes at 93 degrees, and over 25 minutes at 96 degrees. The refractory layer had a target dry coat weight of 33 gsm. The two layer composite of film and refractory layer was wound up on a roll.

The coating process proved to be very difficult due to an extremely low viscosity of the coating solution combined with tendency for the film to wrinkle and crease. Further, the film had to be surface treated by a process such as corona treatment to promote wetting and give a uniform coating, A uniform and continuous refractory layer coating was not obtained.

Comparative Example G

Vermiculite dispersion concentrated to a solids content of 10.8 weight percent was coated on 2 mil thick polyimide (Kapton®) film using a slot die coating system to form a refractory layer on the film. The coated film was dried in an oven at a temperature not exceeding 110 degrees C. until the inorganic refractory layer had moisture content below 5%. The drying time exceeded 75 minutes comprising a staged drying of 9 minutes at 71 degrees, 6 minutes at 82 degrees, 6 minutes at 93 degrees, and 60 minutes at 96 degrees. The refractory layer had a dry coat weight of 33 gsm. The two layer composite of film and refractory layer was wound up on a roll.

Once dried to below 5% moisture content, a very uniform and continuous refractory layer resulted. The layer remained on the surface of the film with enough adhesion to allow for smooth roll winding and post-processing. Refractory layer was easily peeled off the polymeric film base with a help of a reinforcing substrate that was bonded to the exposed side of the refractory film. It was also possible to peel substantial sections of the refractory layer off the polymeric film base without the aid of a reinforcing substrate; however extreme care has to be taken to prevent premature breaks of the film-like refractory layer.

When exposed to a flame on the inorganic refractory layer side, the sample showed a good resistance to flame propagation, with the inorganic refractory layer acting as an effective flame barrier.

However, the drying time for a coating process in excess of 75 minutes was too long to be of practical value. Further, the inorganic refractory material showed signs of localized delamination/detachment from the polymeric film base when flexed.

Comparative Example H

This was as Comparative Example D except that the film layer did not have a metalized surface. The findings were the same as for Comparative Example G, with the exception for flame propagation properties. When exposed to a flame on the inorganic refractory layer side, an inorganic refractory layer acted as an effective flame barrier, however the overall 2-layer composite propagated fire on the polymeric film side.

Comparative Example I

Vermiculite dispersion was coated on 5.6 mil thick reinforced polyethylene sheet using a doctor blade. The polyethylene sheet was Tyvek® grade 10560 from DuPont. The coated sheet was dried in an oven at 90 degrees C. until the refractory layer had moisture content below 5%. The drying time was 30 minutes. The dry basis weight of of the refractory layer was 37 gsm.

The dried refractory layer could not be removed from the sheet even with the help of a reinforcing substrate bonded to the exposed side of the refractory layer. Cohesive bond failure within the refractory layer was observed. The polyethylene sheet was unsuitable for use.

Comparative Example J

Vermiculite dispersion concentrated to a solids content of 10.8% weight percent was coated on 11 mil thick hydrophilic gray Rag Kraft paper using a slot die coating system to form a refractory layer on the paper. The paper comprised a blend of 50 weight percent of cellulose fibers and 50 weight percent of cotton fibers and was obtained from Crocker Technical Papers.

The paper had a basis weight of 8.1 oz/sq. yd., an average thickness of 11.0 mil, a density of 1.0 cc, a Gurley Air Resistance of 714 sec/100 cc, 20 oz. cyl., a smoothness of 103 Sheffield units, a dry tensile strength of 122.0 lb/in. in the machine direction and 40.0 lb./in. in the cross direction. The wet tensile strength was 6.4 lb/in. in the machine direction and 2.5 lb/in, in the cross direction.

The coated paper was dried for 15 minutes in an air flotation oven at a temperature not exceeding 110 degrees C. until the inorganic refractory layer had moisture content below 5%. Differential drying temperatures were applied to the top (vermiculite side) and the bottom (paper side). The drying profile on the top side was 5 minutes at 49 degrees, 5 minutes at 60 degrees and 5 minutes at 71 degrees. The drying on the bottom side was maintained for 15 minutes at 99 degrees. The refractory layer had a dry coat weight of 33 gsm. The two layer composite of film and refractory layer was wound up on a roll.

Once dried to below 5% moisture content, a very uniform and continuous refractory layer resulted. The layer remained on the surface of the paper with enough adhesion to allow for smooth roll winding and post-processing. The refractory layer was easily peeled off the paper base with a help of reinforcing substrate that was bonded to the exposed side of the refractory film. With extreme care it was also possible to peel short sections of the refractory layer from the paper base without the aid of a reinforcing substrate.

When exposed to a flame on the inorganic refractory layer side, the refractory layer acted as an effective flame barrier, however the overall 2-layer composite propagated fire on the paper side.

What is claimed is:

1. A layered sheet comprising a flame resistant wet-laid nonwoven paper carrier having a first and second surface and an inorganic refractory layer comprising 100 percent platelets of vermiculite adjacent to at least one surface of the nonwoven paper carrier wherein the refractory layer has a dry areal weight of from 15 to 50 gsm, a residual moisture content of no greater than 10 percent by weight and wherein the nonwoven paper carrier
   (i) comprises from 40 to 70 weight percent of aramid fibers and from 30 to 60 weight percent of polymeric binder,
   (ii) is hydrophilic
   (iii) has a wet tensile strength of at least 3 lb/in in a first direction and at least 2 lb/in in a second direction, the second direction being transverse to the first direction,
   (iv) has a dry tensile strength of at least 7 lb/in in a first direction and at least 3 lb/in in a second direction, the second direction being transverse to the first direction,
   (v) has an air permeability no greater than 2000 Gurley Air Resistance (sec/25 cc, 20 oz. cyl.),
   (vi) has a smoothness on at least one surface of no greater than 150 Sheffield units,
   (vii) has a surface release value from at least one surface of from 0.25 to 0.8 lb/in,
   (viii) has a thickness of from 0.025 to 0.175 mm,
   (ix) has a density of from 0.60 to 1.1 g/cc, and
   (x) has a basis weight of from 20 to 70 gsm, and wherein the layered sheet is a component of a flame barrier for a thermal insulation and acoustic blanket.

2. The layered sheet of claim 1 wherein the aramid fiber comprising the nonwoven paper carrier is meta-aramid or para-aramid.

3. The layered sheet of claim 1 wherein the layered sheet, when wet, has shrinkage no greater than 2 percent.

4. The layered sheet of claim 1 wherein the refractory layer has a dry areal weight of from 20 to 35 gsm.

5. The layered sheet of claim 1 wherein the nonwoven paper carrier has a wet tensile strength of at least 15 lb/in in a first direction and at least 5 lb/in in a second direction, the second direction being transverse to the first direction.

6. The layered sheet of claim 1 wherein the nonwoven paper carrier has a dry tensile strength of at least 20 lb/in in a first direction and at least 7 lb/in in a second direction, the second direction being transverse to the first direction.

7. The layered sheet of claim 1 wherein the nonwoven paper carrier has an air permeability of from no greater than 500 Gurley Air Resistance (sec/25 cc, 20 oz. cyl.).

8. The layered sheet of claim 1 wherein the nonwoven paper carrier has a thickness of from 0.025 to 0.100 mm (1-4 mil).

9. The layered sheet of claim 1 wherein the nonwoven paper carrier has a thickness of from 0.038 to 0.075 mm (1.5 to 3 mil).

10. The layered sheet of claim 1 wherein the nonwoven paper carrier has density of from 0.65 to 0.95 g/cc.

11. The layered sheet of claim 1 wherein the nonwoven paper carrier has a density of from 0.70 to 0.85 g/cc.

12. The layered sheet of claim 1 wherein the nonwoven paper carrier is thermally stable at 150 degrees C. for at least 10 minutes.

13. The layered sheet of claim 1 wherein the refractory layer has a residual moisture content of no greater than 3 percent by weight.

14. The layered sheet of claim 1 wherein a smoothness on at least one surface of the nonwoven paper carrier is no greater than 80 Sheffield units.

* * * * *